US005373159A

United States Patent [19]

Goldenberg et al.

[11] Patent Number: 5,373,159

[45] Date of Patent: Dec. 13, 1994

[54] METHOD FOR DETECTING A FIRE CONDITION

[75] Inventors: Ephraim Goldenberg, Tel Aviv; Tal Olami; Jacob Arian, both of Beersheba, all of Israel

[73] Assignee: Spectronix Ltd., Tel Aviv, Israel

[21] Appl. No.: 115,066

[22] Filed: Sep. 2, 1993

[30] Foreign Application Priority Data

| | | | |
|---|---|---|---|
| Sep. 8, 1992 | [IL] | Israel | 103094 |
| Jan. 1, 1993 | [IL] | Israel | 104298 |
| Apr. 9, 1993 | [IL] | Israel | 105351 |

[51] Int. Cl.[5] .......... G08B 17/12; G01J 3/36

[52] U.S. Cl. .......... 250/339.15

[58] Field of Search .......... 250/339.15

[56] References Cited

U.S. PATENT DOCUMENTS

| | | | |
|---|---|---|---|
| 4,639,598 | 1/1987 | Kern et al. | 250/339.15 |
| 4,785,292 | 11/1988 | Kern et al. | 340/578 |
| 5,153,563 | 10/1992 | Goto et al. | 340/578 |

FOREIGN PATENT DOCUMENTS

| | | | |
|---|---|---|---|
| 2-8717 | 1/1990 | Japan | 250/339.15 |
| 1550334 | 8/1979 | United Kingdom | 250/339.15 |

*Primary Examiner*—Constantine Hannaher
*Attorney, Agent, or Firm*—Mark M. Friedman

[57] ABSTRACT

A method of detecting a fire condition in a monitored region includes concurrently monitoring the region by a first sensor sensitive to radiation within a first bandwidth which includes the $CO_2$ emission band, by a second sensor sensitive to radiation within a second bandwidth which includes wavelengths mainly lower than the $CO_2$ emission band, and by a third sensor sensitive to the radiation within a third bandwidth which includes wavelengths higher than the $CO_2$ emission band. The measurements of all these sensors are utilized in determining the presence or absence of the fire condition in the monitored region.

17 Claims, 6 Drawing Sheets

METHOD FOR DETECTING A FIRE CONDITION

FIELD AND BACKGROUND OF THE INVENTION

The present invention relates to a method for detecting a fire condition in a monitored region, and particularly to such a method effective at relatively long ranges and/or with relatively small fires.

One of the problems in detecting fire conditions, particularly at long ranges or of small fires, is the high false alarm rate. Thus, the range of detection can be increased by increasing the sensitivity of the system, e.g., by appropriately setting the amplification level and/or the threshold level. However, this increase in sensitivity also tends to increase the false alarm rate caused by spurious radiation sources, such as sunlight, artificial light, welding, electrical heaters, ovens, etc., or by other sources of noise. Such spurious radiation sources might not be large enough to activate short-range detectors, but may be large enough to activate detectors whose sensitivity has been increased to increase the range. A false alarm may result in a costly discharge of the fire extinguisher; and if the fire extinguisher is of the type requiring replacement before reuse, the false alarm may disable the fire extinguisher system until it has been replaced or recharged.

A number of attempts have been made for increasing the range of a fire detector system without substantially increasing the false alarm rate. Some described systems utilize two sensors in different spectrum ranges, as illustrated in U.S. Pat. Nos. 3,653,016, 3,665,440, 3,825,754, 3,931,521, 4,639,598 and 4,983,853. Other described systems utilize an AC coupling and a level ratio test, as illustrated in U.S. Pat. No. 4,455,487. In another proposed system, the detector examines the frequency characteristics of monitored signals produced by a sensor in order to distinguish between fire-produced radiation and spurious radiation.

OBJECTS AND BRIEF SUMMARY OF THE INVENTION

According to the present invention, there is provided a method of detecting a fire condition in a monitored region including: (a) concurrently monitoring the region by a first sensor sensitive to radiation within a first bandwidth which includes the $CO_2$ emission band, by a second sensor sensitive to radiation within a second bandwidth which includes wavelengths mainly lower than the $CO_2$ emission band, and by a third sensor sensitive to the radiation within a third bandwidth which includes wavelengths higher than the $CO_2$ emission band, and producing first, second and third measurements of radiation variations emitted from the monitored region; and (b) utilizing the measurements in determining the presence or absence of the fire condition in the monitored region.

Several embodiments of the invention are described below for purposes of example.

In some described embodiments, the third sensor senses infrared radiation over a broad band. Particularly good results have been obtained when the first sensor senses infrared radiation within the 4.4–4.7 μm band, the second sensor senses radiation within the 3.8–4.1 μm band, and the third sensor senses radiation within the 3.8–4.7 μm band.

In another described embodiment, the third sensor senses infrared radiation within a bandwidth which includes wavelengths mainly higher than the $CO_2$ emission band. Particularly good results were obtained with respect to the latter embodiment when the first sensor senses infrared radiation within the 4.3–4.6 μm band, the second sensor senses radiation within the 3.8–4.2 μm band, and the third sensor senses radiation within the 4.8–5.1 μm band.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

The Apparatus of FIGS. 1–4

Figure 1:
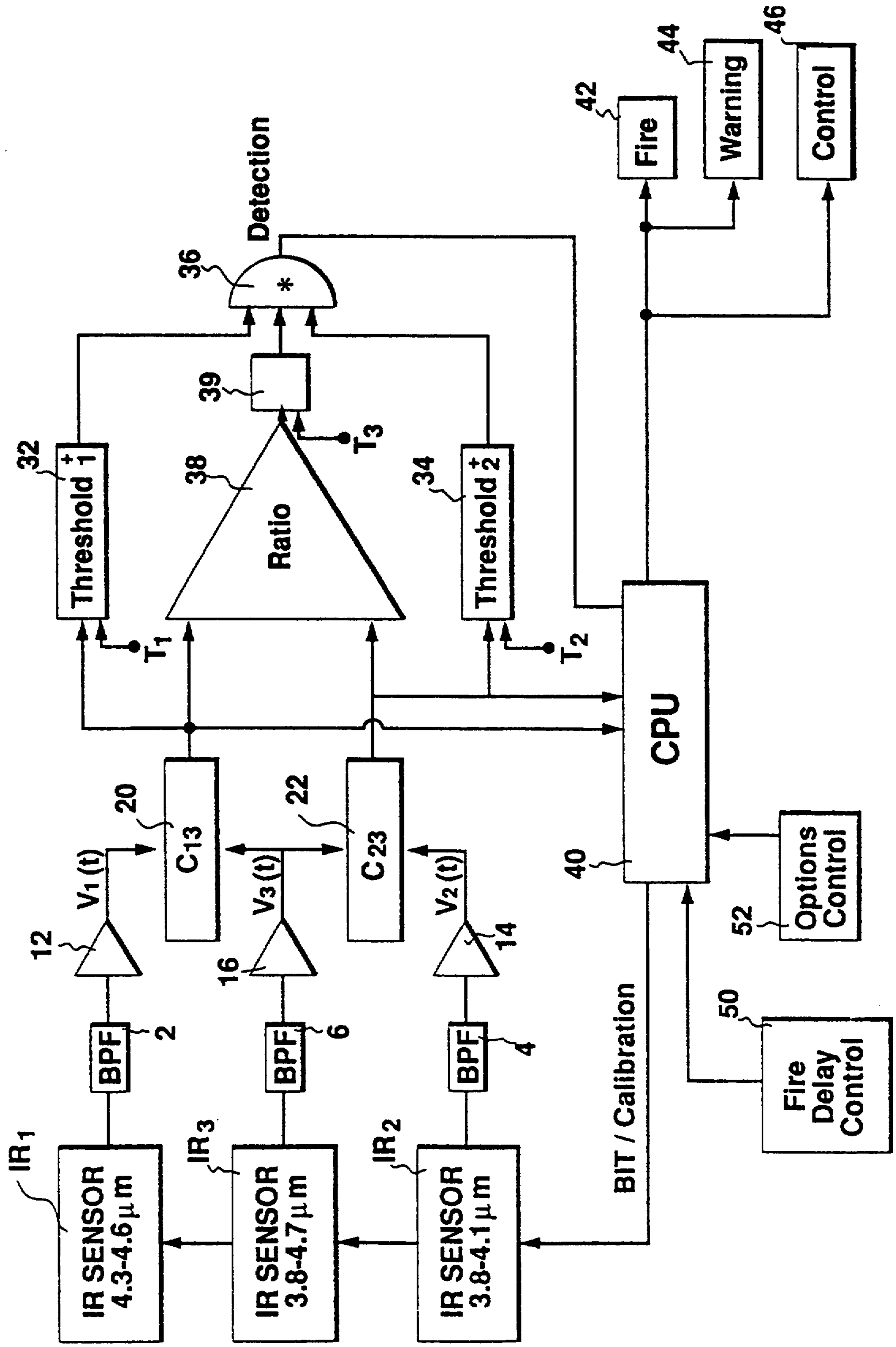
FIG. 1 is a block diagram illustrating one apparatus for detecting a fire condition in accordance with the present invention.

The apparatus illustrated in FIG. 1 comprises three sensors, namely $IR_1$, $IR_2$ and $IR_3$, for concurrently monitoring the radiation emitted from the monitored region. The outputs of the three IR sensors $IR_1$, $IR_2$ and $IR_3$, are fed to bandpass filters 2, 4, 6, and to amplifiers 12, 14, 16, respectively, to produce three measurements of the radiation variations emitted from the monitored region within the three bands of the filters 2, 4, 6. These measurements, as outputted from their respective amplifiers 12, 14, 16, are indicated by the three varying signals $V_1(t)$, $V_2(t)$ and $V_3(t)$, respectively.

The three amplifiers 12, 14, 16, are tuned to amplify the signals from their respective bandpass filters 2, 4, 6 within a frequency range of 2–10 Hz. This is the flame flicker frequency, so that their respective output signals will represent the measurements of the three sensors within their respective bandwidths at the flame flicker frequency.

The apparatus illustrated in FIG. 1 further includes two correlation circuits 20, 22, for producing correlation values between the measurement of the third sensor $IR_3$ and the other two sensors $IR_1$ and $IR_2$, respectively. Thus, correlation circuit 20 determines the correlation value between signal $V_3(t)$ produced by sensor $IR_3$ and signal $V_1(t)$ produced by sensor $IR_1$, and outputs a first correlation value $C_{13}$ representing the correlation between these two measurements. Similarly, correlation circuit 22 determines the correlation value between signal $V_3(t)$ produced by sensor $IR_3$ and signal $V_2(t)$ produced by sensor $IR_2$, and outputs a correlation value $C_{23}$ representing the correlation between these two measurements.

Figure 2:
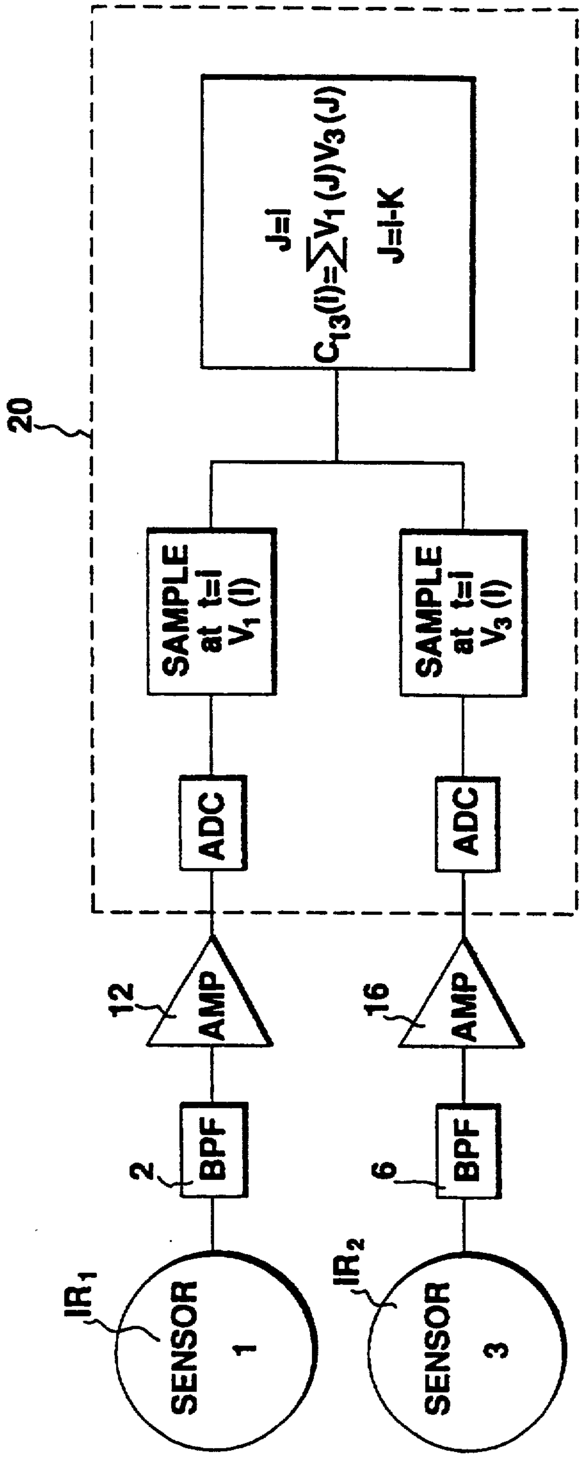
FIG. 2 is a block diagram illustrating the correlation circuit with respect to two of the sensors in the apparatus of FIG. 1.

Correlation is effected between each pair of signals by converting the analog outputs of the respective sensors, moving one signal over the other, and summing the product of all the points, as described for example in the above-cited U.S. Pat. No. 4,639,598. The result of the correlation is a time dependent signal. FIG. 2 illustrates the correlation circuit 20 for effecting correlation in this manner between the outputs of the two sensor $IR_1$ and $IR_3$. It will be appreciated that the correlation circuit 22 for effecting correlation between the two sensors $IR_2$ and $IR_3$ would be the same.

The first correlation value $C_{13}$ from correlation circuit 20 is inputted into a comparator 32 and is compared with a predetermined threshold value $T_1$; similarly, the second correlation value $C_{23}$ from correlation circuit 22 is inputted into a second comparator 34 and is compared with a second threshold value $T_2$. When the respective correlation value $C_{13}$, $C_{23}$, is equal to or exceeds the respective threshold value, comparators 32, 34 output a signal of binary value "1"; and at all other times, the comparators output a signal of a binary value "0". The outputs of the two comparators 32, 34 are fed to an AND-gate 36.

The two correlation values $C_{13}$, $C_{23}$ from the correlation circuits 20, 22 are also inputted into a ratio-determining circuit 38. Circuit 38 determines the ratio of these two correlation values and outputs a correlation-ratio signal. The latter signal is fed to a third comparator 39 where it is compared with a threshold value $T_3$, and similarly outputs a "1" or "0" to the AND-gate 36.

The system illustrated in FIG. 1 further includes a CPU 40 which, among other functions, stores the threshold values applied to the comparators 32, 34 and 39, and receives the signal outputted from the AND-gate 36. It will thus be seen that a "1" output from AND-gate 36 indicates the coincidence of the following three conditions: (1) the first correlation signal $C_{13}$ equals or exceeds the predetermined threshold of comparator 32; (2) the second correlation value $C_{23}$ equals or exceeds the predetermined threshold of comparator 34; and (3) the ratio of the two correlation values $C_{13}$ and $C_{23}$ equals or exceeds the predetermined threshold of comparator 39. When all these conditions are present, AND-gate 36 outputs a signal to the CPU 40 indicating that a fire condition is present in the monitored region. The CPU may then output a signal to a fire alarm unit 42, to a warning unit 44, or to a control unit 46, e.g., to actuate a fire extinguisher.

The CPU 40 may include other optional controls, for example a fire delay control 50 to delay the actuation of the fire alarm, in order to better assure that the condition is not a false alarm. Other optional controls, indicated by block 52, may also be inputted to the CPU 40 such as a sensitivity adjustment control. The CPU 40 further includes BIT (built-in test)/calibration devices, as known, for testing and/or calibration purposes.

Figure 3:
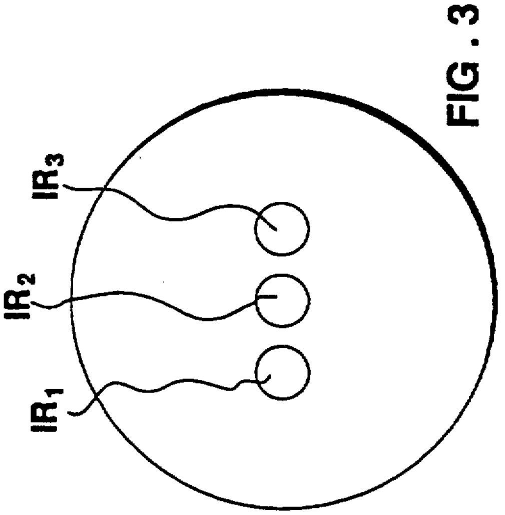
FIG. 3 illustrates a preferred arrangement of the three infrared sensors in the apparatus of FIG. 1.
Figure 4:
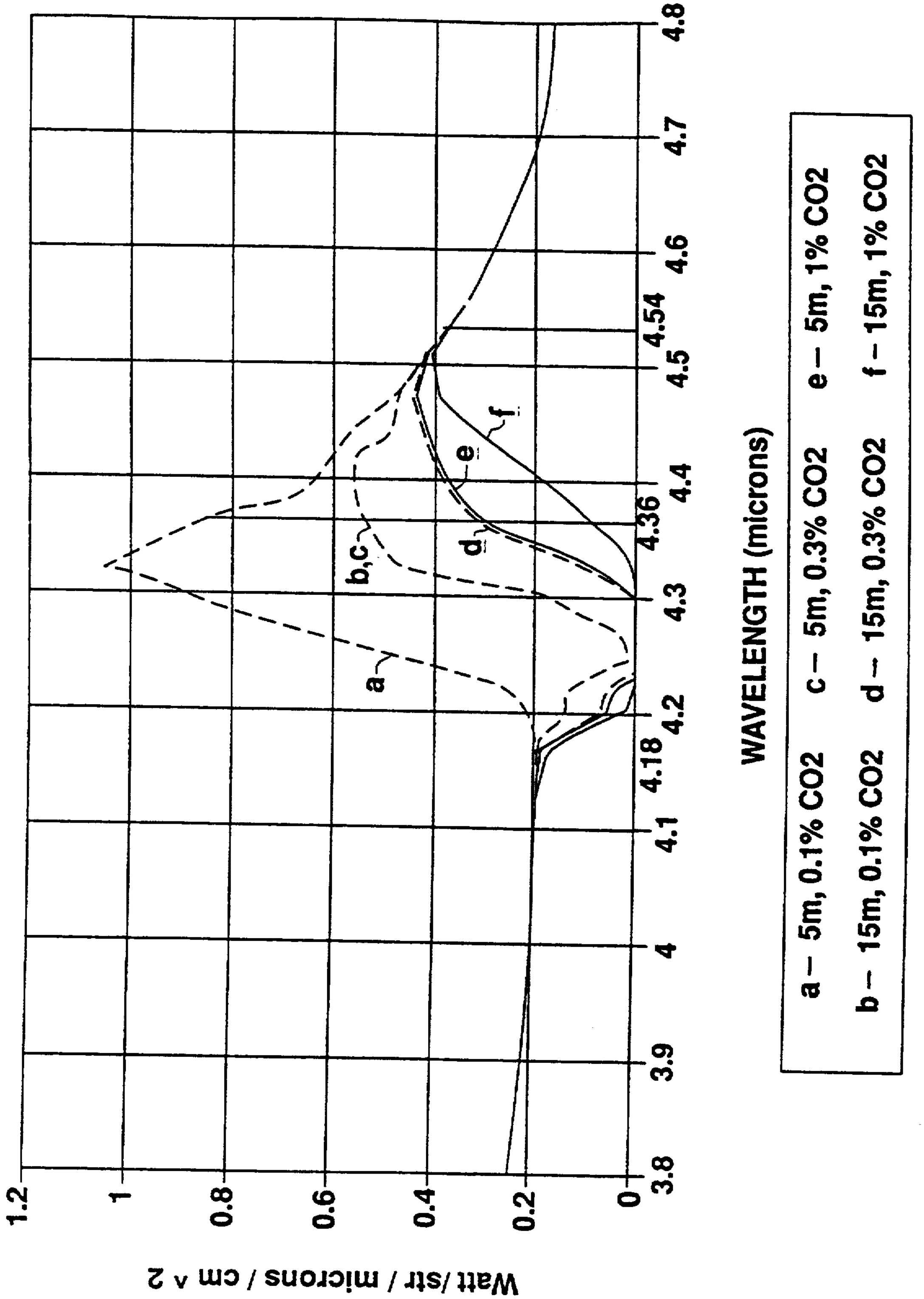
FIG. 4 illustrates a set of curves helpful in understanding the method and apparatus of FIG. 1 for detecting fire conditions.

FIG. 3 illustrates a preferred arrangement of the infrared sensors, wherein they are arranged in a straight line, with the middle sensor $IR_2$ being sensitive to radiation below the $CO_2$ emission band. In this example, sensor $IR_1$ at one end senses radiation within the 4.3–4.6 $\mu$m band; the intermediate sensor $IR_2$ senses radiation within the 3.8–4.1 $\mu$m band; and sensor $IR_3$ at the opposite end senses radiation within the 3.8–4.7 $\mu$m band.

The above described apparatus defines a fire condition as an IR source which alternates at a frequency of 2–10 Hz (the flame flicker frequency) and which emits strongly in the $CO_2$ emission band (4.3–4.6 $\mu$m), and weakly below the $CO_2$ emission band (3.8–4.1 $\mu$m). These emission bands are more clearly seen in FIG. 4. Curves a–f of FIG. 4 particularly show that the atmospheric influences are smallest within the narrower range of 4.36–4.54 $\mu$m. In order to minimize the atmospheric influences it is preferable to use the narrower band of 4.36–4.54 $\mu$m for the IR sensor $IR_1$ detecting the emissions within the $CO_2$ emission band.

The use of the third sensor $IR_3$ substantially increases the sensitivity of the system, to increase the range of fire detection and/or decrease the size of a detectible fire, without substantially increasing the false alarm rate. Thus, the measurement of each of the two sensors $IR_1$, $IR_2$ includes a signal component and a noise component. In case of a large fire or a close fire, the signal component would normally be much larger than the noise component, and therefore the ratio of their two outputs would be more closely equal to the ratio of the respective signal components. However, in the case of a small fire, or a fire at a large distance from the detector, the noise component becomes much larger than the signal component, and therefore the ratio of the outputs of the two sensors $IR_1$, $IR_2$ would be closer to the ratio of their noise components, which is a meaningless value. However, by adding the third sensor $IR_3$ to produce a measurement concurrently with the measurements of the other two sensors $IR_1$, $IR_2$, the signal component of the third sensor is in phase with the signal components of the other two sensors and therefore increases the signal component of the overall signal, without increasing the noise component since the noise component of the third sensor is out of phase with the noise components of the other two sensors. The overall result is an improvement in the signal-to-noise ratio in the overall system, thereby increasing its sensitivity without significantly increasing its false alarm rate.

The threshold values $T_1$, $T_2$, $T_3$ utilized in comparators 32, 34 and 39 may be predetermined in advance by simulating the type of fire condition to be detected, and then determining these threshold values such that a "1" is outputted in each of the three comparators under such a simulated fire condition. These threshold values can be stored in the CPU 40 and used in the monitoring process, or can be optionally modified, e.g., by the optional control block 52, to obtain any desired sensitivity and permissible false alarm rate according to any particular application. The optional control block 50 in FIG. 1 may be used for preselecting the time duration during which a fire condition must be detected before actuating the warning alert 44, the fire alarm 42, or the control device 46 such as a fire extinguisher system.

Figure 5:
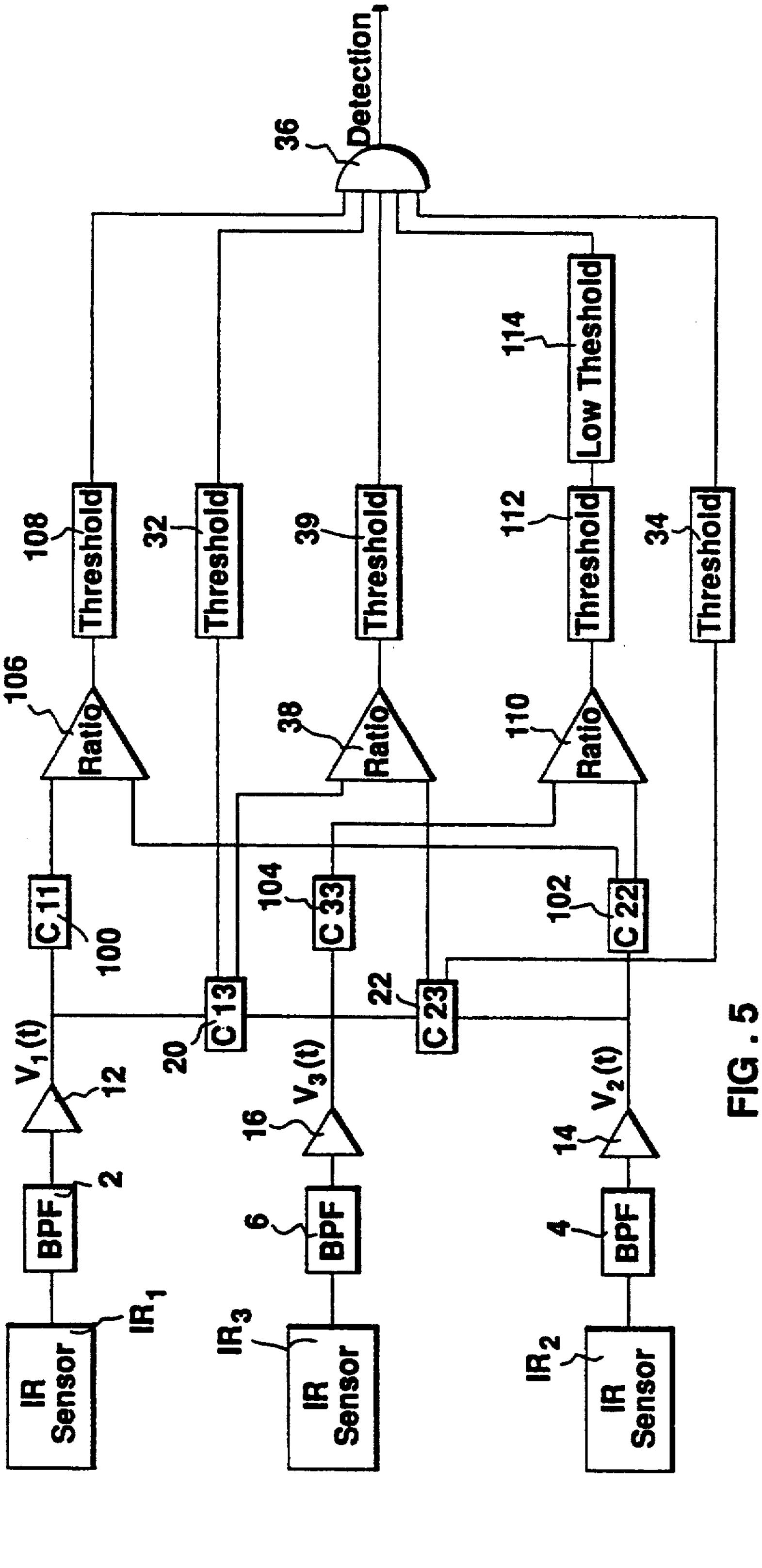
FIG. 5 is a block diagram illustrating another apparatus for detecting a fire condition in accordance with the invention.
Figure 6:
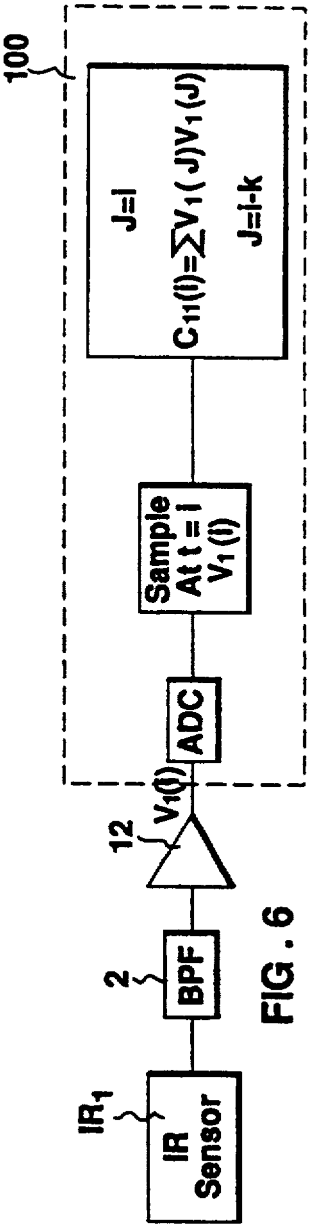
FIG. 6 is a block diagram illustrating the auto-correlation circuit for effecting auto-correlation of the output of one of the sensors, it being appreciated that a similar circuit is used for each of the other two sensors.

The Apparatus fo FIGS. 5 and 6

The apparatus illustrated in FIG. 5 is very similar to that illustrated in FIG. 1. To facilitate understanding, the same reference numerals have been used for corresponding parts, and the new parts are identified by reference numerals starting with "100".

Thus, as shown in FIG. 5, the output of sensor $IR_1$, after passing through its bandpass filter 2 and amplifier 12, is auto-correlated without normalization in auto-correlation circuit 100 to produce auto-correlation value $C_{11}$. In a similar manner, the outputs of the two sensors $IR_2$ and $IR_3$ are auto-correlated in circuits 102 and 104, respectively, to produce second and third auto-correlation values $C_{22}$ and $C_{33}$, respectively.

The ratio of the first auto-correlation value $C_{11}$ from circuit 100, and of the second auto-correlation value $C_{22}$ from circuit 102, is determined in a ratio circuit 106, and is compared to a predetermined threshold value 108. Similarly, the ratio of the second and third auto-correlation values, from circuits 102 and 104, respectively, is determined by ratio circuit 110, and its output is compared to a predetermined high threshold value in circuit 112, and also to a predetermined low threshold value in circuit 114.

The outputs of threshold circuits 108 and 114 are fed to AND-gate 36, with the outputs of the other signals as described above. The output of that gate is fed to the CPU (40, FIG. 1) for use in determining the presence or absence of a fire condition in the monitored area in the same manner as described above.

FIG. 6 illustrates the auto-correlation circuit 100 for sensor $IR_1$. The auto-correlation value is determined by moving the signal outputted from sensor $IR_1$ over itself, without normalization, and summing the products of all the points of the two signals. It will be appreciated that auto-correlation circuits 102 and 104 for the two other sensors $IR_2$, $IR_3$ are constructed and operate in the same manner.

Figure 7:
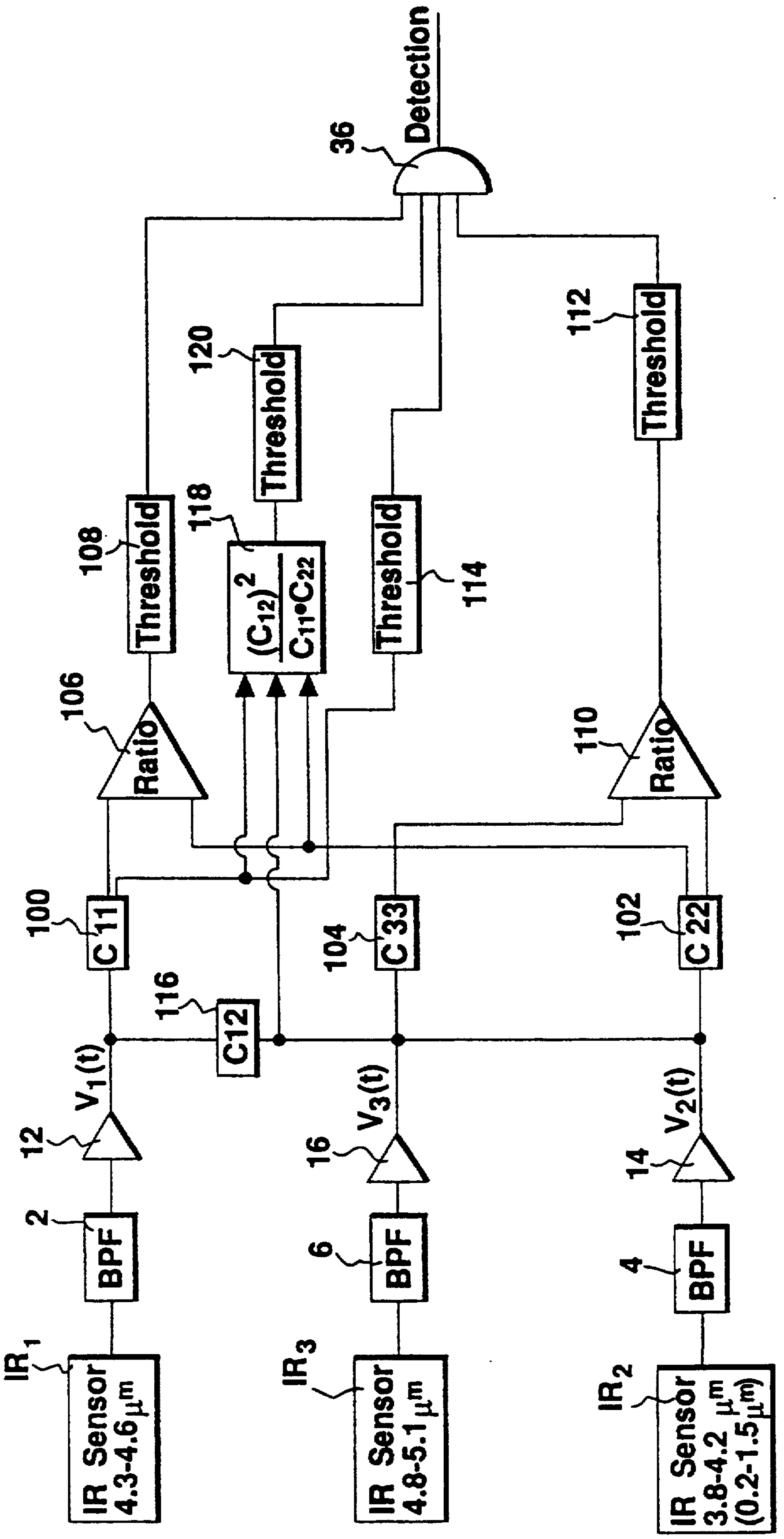
FIGS. 7 and 8 are block diagrams illustrating two further forms of apparatus constructed in accordance with the present invention.
Figure 8:
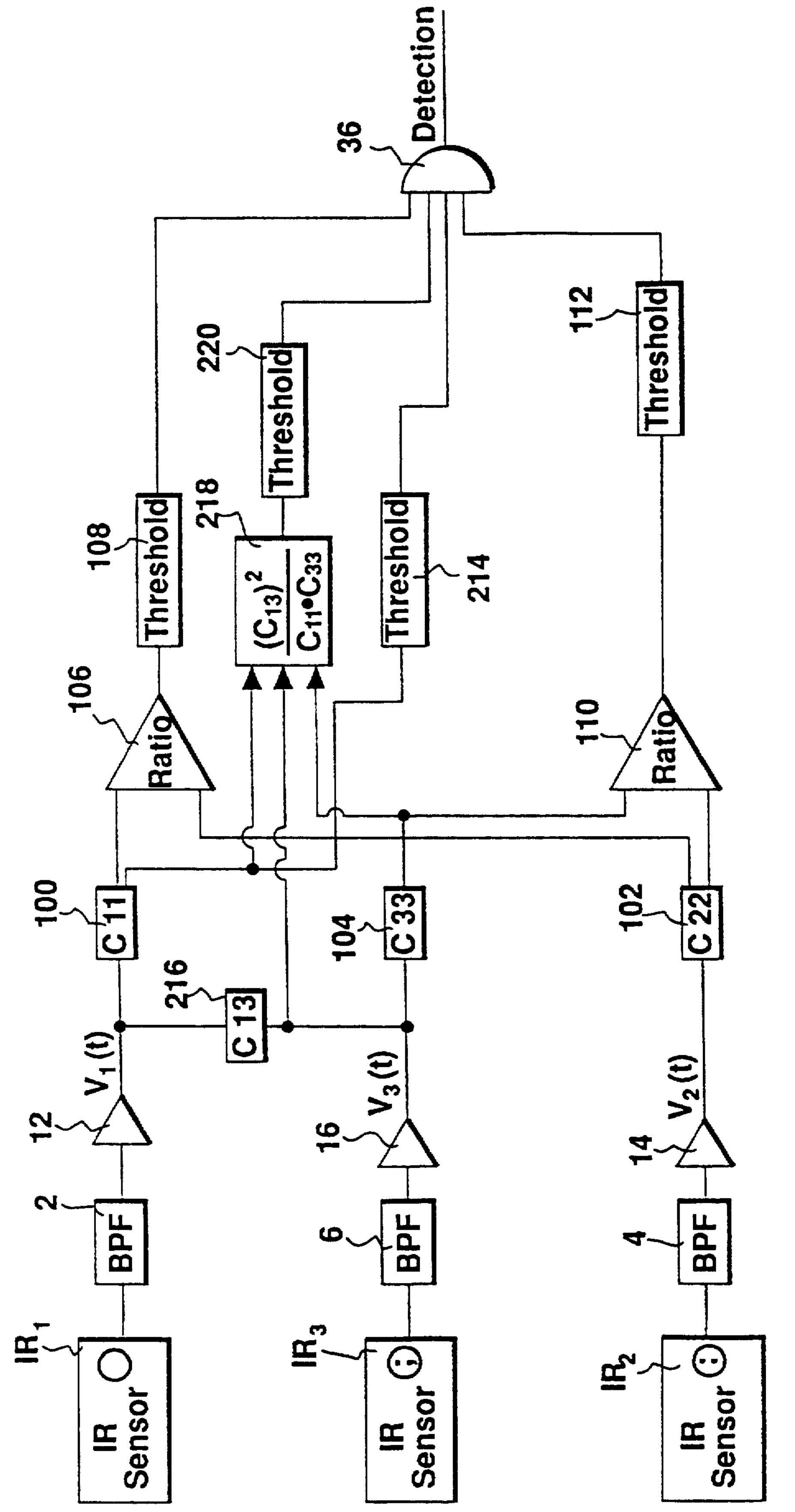

The Apparatus of FIGS. 7 and 8

FIGS. 7 and 8 are block diagrams illustrating two forms of apparatus which are very similar to those described above; to facilitate understanding, the same reference numerals have been used for corresponding parts.

The system illustrated in FIG. 7 thus includes three sensors $IR_1$, $IR_2$ and $IR_3$, for concurrently monitoring the radiation emitted from the monitored region. The outputs of the sensors are fed via the three bandpass filters 2, 4, 6 and their respective amplifiers 12, 14 and 16, to produce three measurements of the radiation variations emitted from the monitored region within the three bands of the filters.

Each of the three measurements is auto-correlated with respect to itself without normalization to produce three auto-correlation values $C_{11}$ (block 100), $C_{22}$ (block 102) and $C_{33}$ (block 104). Auto-correlation value $C_{11}$ is compared with auto-correlation value $C_{22}$ in a ratio circuit 106 to produce a correlation ratio ($C_{11}/C_{22}$) which is compared with a predetermined threshold in circuit 108. Auto-correlation value $C_{22}$ is compared with auto-correlation value $C_{33}$ in a ratio circuit 110, to produce a correlation ratio ($C_{33}/C_{22}$) which is compared with another predetermined threshold in circuit 112. In addition, the auto-correlation value $C_{11}$ is compared with a threshold in circuit 114. The results of these three comparisons are fed to AND-circuit 36 and utilized in determining the presence or absence of a fire condition in the monitored area, such that the AND-circuit 36 produces an output (to CPU 40, FIG. 1) indicating a fire condition when there is coincidence between all its inputs.

AND-circuit 36 includes a fourth input which represents the cross-correlation value between the measurement of the first sensor $IR_1$ and the second sensor $IR_2$ after normalization. Thus, the circuit illustrated in FIG. 1 produces a cross-correlation value $C_{12}$ representing the cross-correlation between the measurements of sensors $IR_1$ and $IR_2$. This cross-correlation value is normalized in circuit 118 by multiplying this value by itself, and dividing the product by the product of the auto-correlation value $C_{11}$ received from circuit 100 and the auto-correlation value $C_{22}$ received from circuit 102. The output of circuit 118 is compared with another threshold in circuit 120 and is applied as the fourth input into the AND-circuit 36.

Thus, the AND-circuit 36 will produce an output, indicating a fire condition, only when there is coincidence between all four of its inputs. If any of its inputs is "0", no fire condition will be indicated.

The arrangement illustrated in FIG. 7 has been found to have a relatively high sensitivity to detecting fires and a relatively low false alarm rate, particularly when the first sensor $IR_1$ is sensitive to radiation within the 4.3–4.6 $\mu m$ band, the second sensor $IR_2$ is sensitive to radiation within the 3.8–4.2 $\mu m$ band, and the third sensor $IR_3$ is sensitive to radiation of about 4.8–5.1 $\mu m$, preferably 5.0 $\mu m$.

However, it has been found that the system as described above may be falsely actuated to indicate a fire condition when a welding operation is being performed in the monitored area, which welding operation involves the evaporation of a coating of an organic material on the welding electrode. Such organic materials, when evaporated, produce an emission within the $CO_2$ bandwidth. However, it has also been found that if in the illustrated system the second sensor $IR_2$ is selected to be sensitive to radiation within the 0.2–1.5 $\mu m$ band (which is also below the $CO_2$ emission band), particularly of a wavelength from 1-3–1.4 $\mu m$, the rate of false alarms caused by such a welding operation occurring in the monitored area is substantially reduced.

FIG. 8 illustrates a system which is substantially the same as described above with respect to FIG. 7, and which operates in substantially the same manner, except that the fourth input to the AND-gate 36 is produced by the cross-correlation of the output of the first sensor $IR_1$ with the third sensor $IR_3$, rather than with the second sensor $IR_2$. Thus, box 116 in FIG. 7 indicating the cross-correlation value $C_{12}$, is replaced by box 216 in FIG. 8 indicating the cross-correlation value $C_{13}$; this value is normalized in circuit 218 and compared to a predetermined threshold in circuit 220 before being applied as the fourth input to the AND-gate 36. Circuit 218 normalizes the value $C_{13}$ by multiplying it by itself, and dividing the product by the product of the auto-correlation values $C_{11}$ and $C_{33}$.

In all other respects, including the change in sensor $IR_2$ in order to reduce its sensitivity to false alarms produced by a welding process occurring in the monitored area, the system illustrated in FIG. 8 is constructed and operates in substantially the same manner as described above with respect to the system of FIG. 7.

While the invention has been described with respect to several preferred embodiments, it will be appreciated that many other variations, modifications and applications of the invention may be made.

What is claimed is:

1. A method of detecting a fire condition in a monitored region including the following operations:

(a) concurrently monitoring said region by a first sensor sensitive to radiation within a first bandwidth which includes the $CO_2$ emission band, by a second sensor sensitive to radiation within a second bandwidth which includes wavelengths mainly lower than the $CO_2$ emission band, and by a third sensor sensitive to radiation within a third bandwidth which includes wavelengths higher than the $CO_2$ emission band, wherein said third sensor senses radiation over a broad band which includes the two bands of said first and second sensors, and producing a first, second and third measurements of radiation variations emitted from said monitored region; and (b) utilizing said measurements in determining the presence or absence of the fire condition in said monitored region.

2. The method according to claim 1, wherein said measurements are utilized in determining the presence or absence of a fire condition in said monitored region by:

determining the correlation between each of at least two of said three measurements with one of said three measurements to produce at least two correlation values;

comparing the ratio of said two correlation values to produce a correlation ratio;

comparing said correlation ratio with a predetermined threshold;

and utilizing the results of that latter comparison in determining the presence or absence of a fire condition in the monitored region.

3. The method according to claim 2, wherein a first correlation is determined between said first and third measurements to produce a first correlation value, and a second correlation is determined between said second and third measurements to produce a second correlation value, which two correlation values are compared to produce the correlation ratio which is compared with said predetermined threshold and utilized in determining the presence or absence of a fire condition in the monitored area.

4. The method according to claim 3, wherein each of said first and second correlation values are also compared with a predetermined threshold, which comparisons are also utilized in determining the presence or absence of a fire condition in the monitored area.

5. The method according to claim 3, wherein said first correlation value is determined by moving the signal outputted from the first sensor over the signal outputted by said third sensor and summing the products of all the points of said two signals;

and wherein said second correlation value is determined by moving the signal outputted by said second sensor over the signal outputted by said third sensor and summing the products of all the points of said two signals.

6. The method according to claim 2, wherein the correlation is determined between each of said measurements with respect to itself, without normalization, to produce first, second and third auto-correlation values, respectively; and said first auto-correlation value is compared with said third auto-correlation value to produce a correlation ratio which is compared to a predetermined threshold and utilized in determining the presence or absence of a fire condition in the monitored region.

7. The method according to claim 6, wherein said second auto-correlation value is compared with said third auto-correlation value to produce a second correlation ratio, which is compared to a predetermined threshold and utilized in determining the presence or absence of a fire condition in the monitored region.

8. The method according to claim 7, wherein said first auto-correlation value is compared to a predetermined threshold and is also utilized in determining the presence or absence of a fire condition in the monitored region.

9. The method according to claim 6, wherein a correlation is determined between said first measurement and one of said other two measurements to produce a cross-correlation value, and said cross-correlation value is normalized, compared with a predetermined threshold, and utilized in determining the presence or absence of a fire condition in the monitored region.

10. The method according to claim 9, wherein said cross-correlation value is determined between said first and second measurements by multiplying the cross-correlation value by itself, and dividing the product by the product of said first and second auto-correlation values.

11. The method according to claim 9, wherein said cross-correlation value is determined between said first and third measurements by multiplying it by itself, and dividing the product by the product of said first and third auto-correlation values.

12. The method according to claim 1, wherein said first sensor senses infrared radiation within the 4.4–4.7 μm band; the second sensor senses radiation within the 3.8–4.1 μm band; and the third sensor senses radiation within the 3.8–4.7 μm band.

13. The method according to claim 1, wherein the auto-correlation of at least one of said first, second and third measurements with respect to itself is determined without normalization to produce an auto-correlation value, and said auto-correlation value is also utilized in determining the presence or absence of a fire condition in accordance with operation (b).

14. The method according to claim 13, wherein the auto-correlation of each of said first, second and third measurements with respect to itself is determined without normalization to produce first, second and third auto-correlation values, which values are utilized in determining the presence or absence of a fire condition in operation (b).

15. The method according to claim 14, wherein said operation (b) further includes:

comparing the ratio of said first and second auto-correlation values to produce a first auto-correlation ratio;

comparing the ratio of said second and third auto-correlation values to produce a second auto-correlation ratio;

comparing each of said auto-correlation ratios with a predetermined threshold;

and utilizing the results of the latter comparison for determining the presence Or absence of a fire condition in the monitored area.

16. The method according to claim 15 wherein said ratio of the second and third auto-correlation values are compared to both a high threshold and a low threshold.

17. The method according to claim 1, wherein said third bandwidth of said third sensor includes wavelengths mainly higher than the $CO_2$ emission band.

* * * * *